Figure 2:
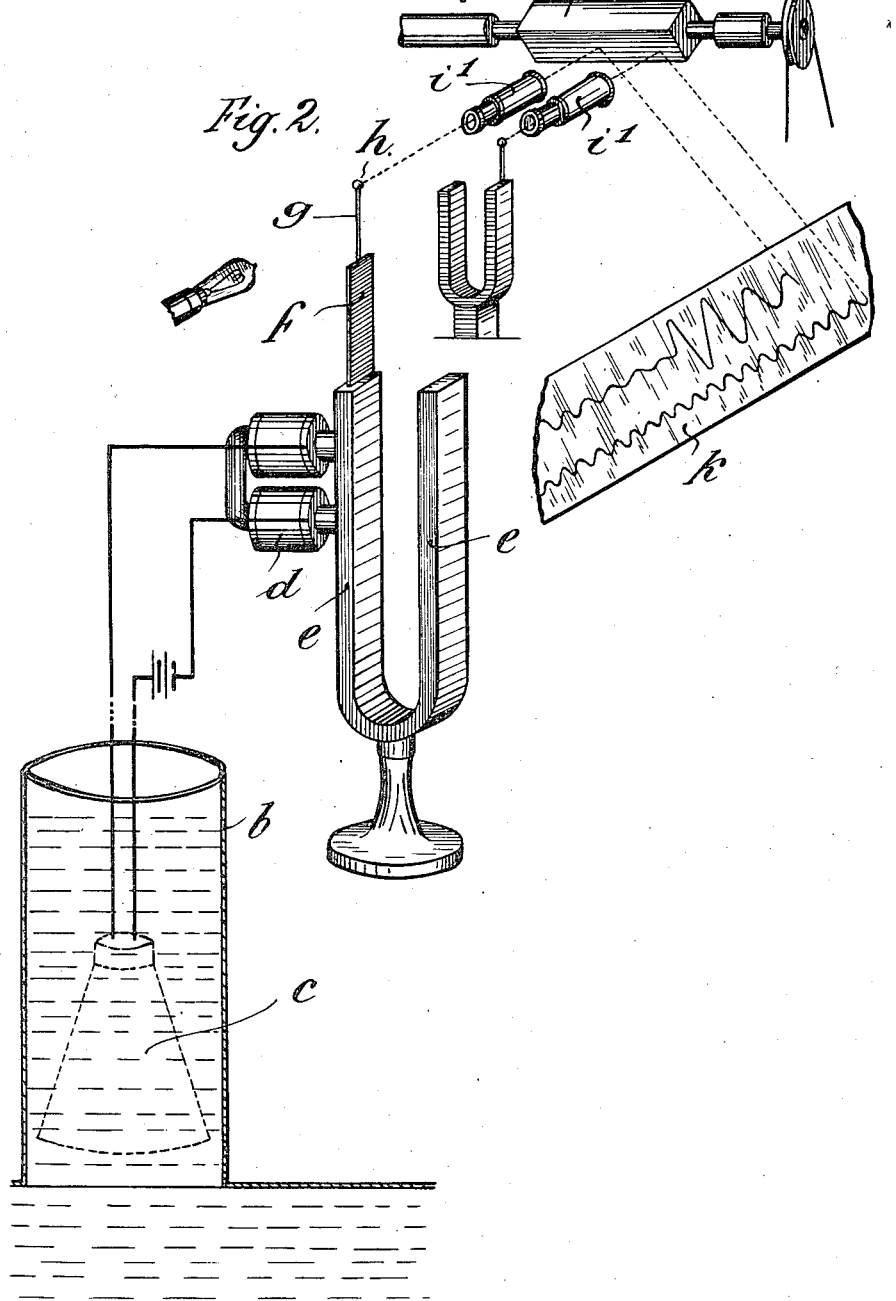

Nov. 15, 1927.    1,649,378
A. BEHM
MEANS FOR SOUNDING OR MEASURING DISTANCE IN WATER
Filed July 7, 1921    2 Sheets-Sheet 1
*Fig. 1.*
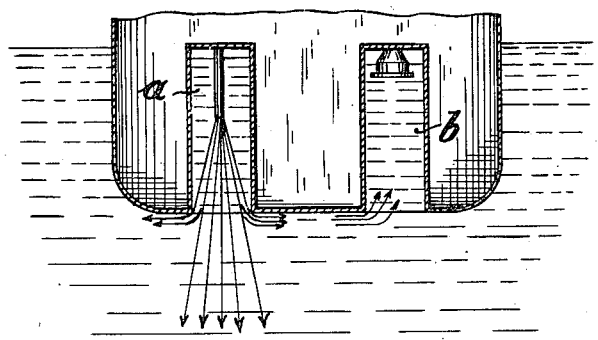
*Fig. 3.*
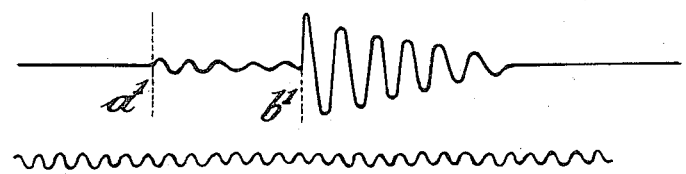
*Fig. 4.*
Inventor
Alexander Behm
By Kingsley Brown
Attys Nov. 15, 1927. 1,649,378

A. BEHM

MEANS FOR SOUNDING OR MEASURING DISTANCE IN WATER

Filed July 7, 1921    2 Sheets-Sheet 2

Inventor
Alexander Behm

Patented Nov. 15, 1927.

1,649,378

UNITED STATES PATENT OFFICE.

ALEXANDER BEHM, OF KIEL, GERMANY.

MEANS FOR SOUNDING OR MEASURING DISTANCE IN WATER.

Application filed July 7, 1921, Serial No. 483,116, and in Germany January 6, 1916.

Various proposals have been made for sounding or measuring distances in water, by measuring the time interval between the sending of a sound and the arrival of its echo but no practicable method has heretofore been devised, though the need for an improved sounding device is much felt. The principal difficulty encountered is the high velocity in water, approximately 1435 m. per sec., owing to which the time interval to be measured is generally too small for obtaining accurate results, especially if the work is done on a war ship or mercantile vessel; with such small intervals it is of great importance to be able to clearly distinguish between the primary sound and its echo.

According to my invention the sound waves are recorded in such a way that those which travel directly to the receiver, by conduction, are clearly distinguished from those, arriving later, which have been reflected to it, say from the bed of the sea or from the hull of a more or less remote ship. For this purpose I screen the receiver from the transmitter by known means so that the sound waves reaching it directly have a weaker effect than the reflected waves. If the recording action is started as soon as the first waves arrive, there is a distinct change in the record when the more powerfully acting reflected waves arrive, and this affords direct means for computation of the distance travelled by the reflected waves.

The invention can, however, also be carried into effect without using a graphic record of the vibrations of the receiver. Thus, for example, deflected sound waves which are only slightly weakened or damped, may be used for starting a measuring instrument, which is stopped by the more powerful reflected waves when they reach the receiver. The latter may be timed or arranged so that it only responds to the echo waves, the measuring instrument being in that case started by other means, as by the action of the transmitter producing the sound.

The invention is illustrated in the annexed drawings, which show diagrammatically one method of carrying it into effect.

Fig. 1 is a section showing the arrangement of the transmitter and receiver in a ship. Fig. 2 shows a suitable receiver in detail, and Figs. 3 and 4 are examples of records obtained.

In the bottom of the ship's hull there are two inverted wells $a$ and $b$, open to the water, containing the transmitter and receiver respectively. Sound waves reflected by the bed of the sea reach the receiver without obstruction, and consequently have a more powerful effect than the laterally travelling waves obstructed by the screen which is formed by the hull between the two wells. Other means may be used for obtaining this effect. For instance the transmitter only may be placed in a well, the receiver being suspended in the water at the side of the ship, or vice versa.

For obtaining a good effect the sound must be sharp and attain its full strength very quickly, and must also cease quickly and without excessive resonance.

It is also desirable that there should be no undue dispersal, the full strength of the sound being directed to the bed of the sea. A powerful sound should be used where practicable, so that the receiver need not be unduly sensitive and can resist such usage as is necessary on board a ship. With a powerful transmitter, the receiver can be made insensitive to such mechanical disturbances and minor local sounds as are liable to occur. The explosion produced by firing a gun is a suitable sound, the barrel of the gun and the well or shaft into which it extends, being directed towards the object whose distance is to be measured. I may also use a charge exploded by means of a detonator in front of a suitable reflector whereby the sound is directed towards the object.

In Fig. 2 showing a receiver, $c$ designates a funnel fitted with a microphone and placed in the well $b$, $d$ being an electromagnet connected to the microphone, and $e$ a tuning fork, to which a glass filament $g$ is connected by a spring $f$. The filament terminates in a small glass ball $h$, forming a lens of short focus, whose movements are photographically recorded on a strip $k$, with the aid of a revolving mirror $i$. On the same strip the vibrations of a uniformly vibrating fork are recorded, the note of this fork being known, and its record forming an index of time.

The mirror $i$ is set in rotation, and at the same time or immediately afterwards the gun is fired. The image of the lens $h$ traces a straight line on the strip till the lens is slightly vibrated by the damped sound waves reaching the receiver by conduction or deflection, and then the record undulates slightly. Then the echo reaches the receiver, and the undulation of the record at once becomes more marked. In Fig. 3 $a^1$ indicates the point at which the shot is fired, and $b^1$ the arrival of the record, the distance between $a^1$ and $b^1$ being an index of the time interval.

Other receivers than that shown can be used, for example a galvanometer, oscillograph, or Braun tube.

As will be seen, it is essential that the receiver records the moment of transmission and the moment of arrival of the echo, the record produced by the echo being distinguishable from the record of the conducted waves.

The receiver may also have two recording devices, one for the direct sound and the other for the echo. A record such as shown in Fig. 4 may then be obtained, $d^1$ being the line made by the standard fork, $e^1$ the line of the direct recorder, and $f^1$ the line of the echo recorder.

Another method of preventing a powerful direct effect on the receiver by the transmitter consists in checking the action of the receiver microphone till a very short time has elapsed after transmission of the sound.

The method described has the advantage that in case of emergency the very clear marking of the record enables a rough estimate of depth or distance to be made in a few seconds, and that careful computation, by correlating the record of the standard fork, enables the distance to be computed with a degree of accuracy not often to be attained with the lead.

The reading may be simplified by using the echo to stop an instrument which measures or marks off very short intervals of time, a clockwork or the like, the strip can then be calibrated so that the depth or distance can be read off directly.

What I claim is:

1. Means for measuring depth or distance in water, comprising an acoustic transmitter, a receiver, and means for substantially shielding said receiver from said transmitter whereby reflected sound waves reach said receiver with appreciably greater intensity than deflected waves.

2. Means for measuring depth or distance in water by means of sound waves comprising a relatively long barrel closed at one end, an acoustic transmitter disposed within said barrel at its closed end, the open end of said barrel being aimed in the direction in which it is desired to send the sound waves, a second barrel similar to said first barrel and similarly disposed, a receiver disposed within said second barrel at its closed end whereby sound waves generated by said transmitter and reaching said receiver by reflection have a greater strength than those arriving by deflection.

3. In a measuring system for depth or distance in water, an acoustic transmitter for creating sound waves, a receiver for sound waves and means auxiliary to said receiver for distinctively recording said sound waves as deflectional or reflectional.

4. In an apparatus for the calculation of depth or distance by means of reflected sound waves, an acoustic transmitter, a receiver, and a substantial barrier interposed between said transmitter and said receiver for shielding the latter from deflected sound waves emanating from the transmitter, whereby waves generated by said transmitter and reflected to said receiver reach the latter with appreciably greater intensity than the deflected sound waves.

5. In an apparatus for the calculation of depth or distance by means of reflected sound waves, two laterally spaced barrels pointed in the direction of the surface whose depth or distance is to be measured, an acoustic transmitter in one of said barrels, and a receiver in the other of said barrels, the walls of said barrels and the intervening space acting as a barrier for shielding said receiver from deflected sound waves emanating from the transmitter, whereby waves generated by said transmitter and reflected to said receiver reach the latter with greater intensity than the deflected sound waves.

6. Means for measuring depth or distance in water comprising a gun for creating sound waves, a receiver, and means for shielding said receiver from said gun whereby reflected sound waves reach said receiver with greater intensity than deflected waves.

The foregoing specification signed this 11 day of May, 1921.

ALEXANDER BEHM.